Nov. 18, 1969 D. R. KOEHLER ET AL 3,479,507

X-RAY SPECTRAL MEASURING SYSTEM UTILIZING A SOLID STATE IONIZATION CHAMBER

Filed Nov. 2, 1966

Dale R. Koehler
John T. Grissom,
INVENTORS.

BY Harry M. Saragovitz
Edward J. Kelly
Herbert Berl
Alfred E. Smith

United States Patent Office 3,479,507
Patented Nov. 18, 1969

3,479,507

X-RAY SPECTRAL MEASURING SYSTEM UTILIZING A SOLID STATE IONIZATION CHAMBER

Dale R. Koehler and John T. Grissom, Huntsville, Ala., assignors to the United States of America as represented by the Secretary of the Army Filed Nov. 2, 1966, Ser. No. 591,658
Int. Cl. G01t 1/24
U.S. Cl. 250—83.3 5 Claims

ABSTRACT OF THE DISCLOSURE

A system for measuring X-ray spectra, utilizing a solid state ionization chamber, an analog-to-digital converter and a digital computer. A pulse of X-ray radiation impinging upon the ionization chamber causes a voltage pulse to be generated by the chamber. This voltage pulse is passed to the converter, the output thereof being fed to the computer which records the pulses representing the input spectrum.

This invention relates to a system and method for measuring X-ray spectra and more particularly to such a system and method utilizing the rise time profile information of a solid state ionization chamber for determining the X-ray spectral distribution from the output pulse of the ionization chamber.

The present invention defines a spectrometric method which depends primarily on the solution of a Fredholm integral equation of the first kind, i.e., the spectral information is not available explicitly from the experimental measurement. The spectral distribution in question appears as the integrand of an integral equation, the integration of which is the experimentally observed function. Measurements of this type are essential to accurately evaluate the effect on materials and components of X-ray environments resulting from thermonuclear weapon tests.

Accordingly, it is an object of this invention to provide a novel system for measuring X-ray spectra in a short-time pulse environment.

It is another object of this invention to provide a novel spectroscopic technique for X-rays utilizing the voltage pulse generated in a solid ionization chamber.

Figure 2:
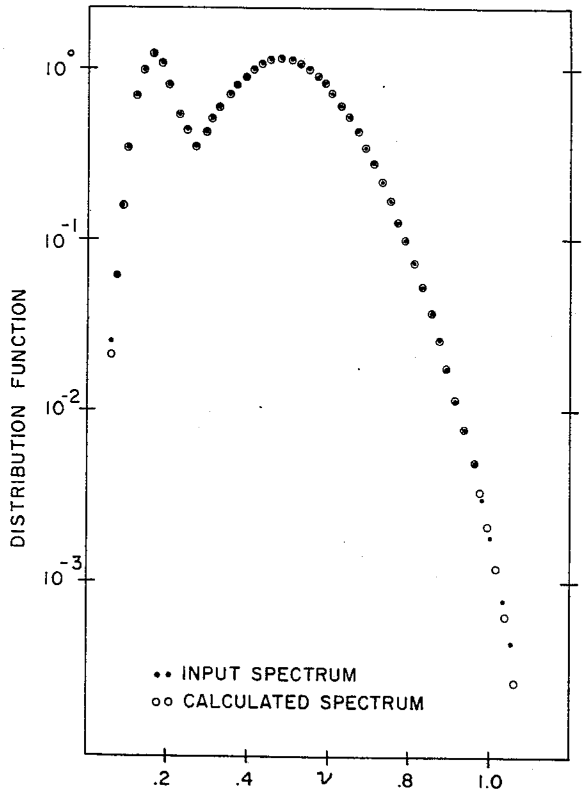
Figure 1:
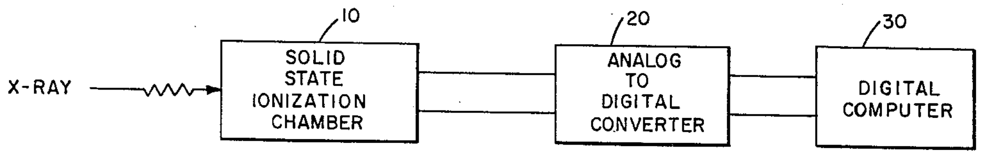

These and other objects and advantages will become apparent upon reference to the following detailed description considered with the accompanying drawing, wherein:

FIGURE 1 is a block diagram illustration of a preferred embodiment of a system according to the present invention; and FIGURE 2 is a plot illustrating the spectral results for a given input spectrum.

Referring now to FIGURE 1, a solid state ionization chamber 10 is shown connected to an analog to digital converter 20 which is in turn connected to a digital computer 30. When a pulse of X-ray radiation impinges upon the ionization chamber 10, a voltage pulse is generated and is expressed as a function of time, $$V(t)=\frac{qN_0h\mu}{c\omega\delta}\left[\frac{1}{\mu}\left(1-e^{-\mu vt}-\mu vt\ e^{-\mu s_0}\right)\right] \quad (1)$$

where $N_0$ is the number of incident X-rays, $h\nu$ is the X-ray energy, $c$ is the ion chamber capacitance, $\omega$ is the plate separation, $\delta$ represents the energy required to form an ion pair, $q$ is the charge on an electron, $v$ is the electron drift velocity, $t$ represents time, $e$ is the base of natural logarithms and $S_0$ is the length of the ionization path. Since for X-rays the maximum range is the depth of the chamber, $\omega$ can be substituted for $S_0$ in Equation 1.

If we now generalize to a spectral distribution $N(\nu)$ of incident X-rays, we obtain the response function $$V(t)=\frac{q}{c\omega\delta}\int_0^{\nu\ \max.}\frac{N(\nu)h\nu d\nu}{\mu(\nu)}\left[1-e^{-\mu(\nu)vt}-\mu(\nu)vt\ e^{-\mu(\nu)\omega}\right]$$

where $\nu$ is the frequency of radiation and $\mu(\nu)$ is the absorption coefficient.

The problem at this point is the unfolding of the integrand $N(\nu)$ from the total response function $V(t)$ and the remaining portion of the integrand. This can be done numerically on computer 30 by replacing the unknown spectral distribution $N(\nu)$ by a polynomial expansion $$\sum_{n=1}^{m} a_n T_n(\nu)$$

and fitting the $m$ undetermined coefficients $a_n$ to $m$ points on the voltage rise-time profile. The $m$ points on the rise-time profile are measured by digitizing the voltage transient in the analog to digital converter 20 and computing the result in computer 30.

Of course, it is not necessary according to the present invention that the spectral distribution of the pulse be obtained with a converter and a computer. For example, the output pulse from the solid ionization chamber 20 could be displayed on an oscilloscope and the pulse analyzed in any conventional or convenient manner.

For the purpose of illustration, diamond was chosen as the material for ionization chamber 10. A depth $$\omega=1.0$$

centimeter and an applied voltage of 1000 volts was assumed and an electron mobility of 156 cm.²/volt sec. was used. The X-ray absorption coefficient, in cm.²/gm., for carbon is approximately $\mu/\rho=1880\ (h\nu)^{-2.85}$ for the energy range considered here. In these calculations, the X-ray energy scale was shrunk to $\nu'=\nu/20$ and energies only from 0–20 kev. considered. With these input data, a voltage profile was calculated for a given X-ray spectra. The results of analyzing the voltage rise time profile to determine the X-ray spectrum is illustrated in FIGURE 2. It is to be noted with the input spectrum represented by dots and the calculated spectrum with circles that the only departure from agreement between the two occurs at the extremes of the energy scale.

While this invention has been described with reference to specific embodiments thereof, it will be apparent that various modifications and changes may be made without departing from the spirit of the invention as defined in the appended claims.

What is claimed is:

1. A system for measuring X-ray spectra in a short-time pulse environment comprising: a solid state ionization chamber which generates a pulse of electrical energy in response to incident X-ray radiation, said pulse being defined by the equation $$V(t)=\frac{q}{c\omega\delta}\int_0^{\nu\ \max.}\frac{N(\nu)h\nu d\nu}{\mu(\nu)}\left[1-e^{-\mu(\nu)vt}-\mu(\nu)vt\ e^{-\mu(\nu)\omega}\right]$$

where

- $V(t)$=output pulse from ionization chamber as a function of time,
- $q$=charge on electron,
- $\delta$=energy required to form an ion pair in the chamber material,
- $c$=capacitance of ionization chamber,
- $\omega$=width of ionization chamber,
- $\nu$=frequency of radiation,
- $N(\nu)$=spectral distribution,
- $\mu(\nu)$=absorption coefficient,
- $h\nu$=energy of X-ray, $e$=2.7182,
$t$=time, and
$v$=electron drift velocity;

and means connected to said ionization chamber for analyzing said pulse and extracting the spectral distribution therefrom.

2. A system as set forth in claim 1 wherein said means comprises an analog to digital converter connected to said ionization chamber and a digital computer connected to said converter.

3. A method of measuring X-ray spectra comprising the steps of generating an electrical pulse in response to X-ray radiation, said pulse being defined by the equation $$V(t)=\frac{q}{c\omega\delta}\int_0^{\nu\,\max.}\frac{N(\nu)h\nu d\nu}{\mu(\nu)}[1-e^{-\mu(\nu)vt}-\mu(\nu)vt\,e^{-\mu(\nu)\omega}]$$

$V(t)$=output pulse from ionization chamber as a function of time,
$q$=charge on electron,
$\delta$=energy required to form an ion pair in the chamber material,
$c$=capacitance of ionization chamber,
$\omega$=width of ionization chamber,
$\nu$=frequency of radiation,
$N(\nu)$=spectral distribution,
$\mu(\nu)$=absorption coefficient, $h\nu$=energy of X-ray,
$e$=2.7182,
$t$=time,
$v$=electron drift velocity;

detecting the voltage rise time profile of said pulse; and analyzing said pulse to determine the spectral distribution in the pulse.

4. The method set forth in claim 3 wherein the step of analyzing said pulse includes the steps of digitizing said pulse and computing the spectral distribution therein.

5. The method set forth in claim 3 wherein the step of analyzing said pulse includes the steps of displaying the pulse as a function of time and computing the spectral distribution therein.

References Cited

UNITED STATES PATENTS

| | | | |
|---|---|---|---|
| 3,126,483 | 3/1964 | Hoalst | 250—83.3 |
| 3,188,470 | 6/1965 | Ricker et al. | 250—83.1 |
| 3,198,944 | 8/1965 | Furbee | 250—83.3 X |
| 3,270,205 | 8/1966 | Ladd et al. | 250—83.3 |

ARCHIE R. BORCHELT, Primary Examiner

U.S. Cl. X.R.

250—51.5